United States Patent
Cai et al.

(10) Patent No.: US 11,783,513 B2
(45) Date of Patent: Oct. 10, 2023

(54) METHOD, SYSTEM, MEDIUM, AND DEVICE FOR PROCESSING VECTOR GRAPHICS PRIMITIVES TO DETERMINE PATH EDGE ORDER FOR PATH FILLING

(71) Applicants: VeriSilicon Microelectronics (Shanghai) Co., Ltd., Shanghai (CN); VeriSilicon Holdings Co., Ltd., Cayman Islands (KY); VeriSilicon Microelectronics (Nanjing) Co., Ltd., Nanjing (CN)

(72) Inventors: Mike M Cai, Newark, CA (US); Yi Zhang, Shanghai (CN); Yijun Li, Shanghai (CN); Kui Qin, Shanghai (CN)

(73) Assignees: VeriSilicon Microelectronics (Shanghai) Co., Ltd., Shanghai (CN); VeriSilicon Holdings Co., Ltd., Grand Cayman (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 17/378,807

(22) Filed: Jul. 19, 2021

(65) Prior Publication Data
US 2022/0058838 A1    Feb. 24, 2022

(30) Foreign Application Priority Data
Jul. 17, 2020    (CN) .......................... 202010692846.1

(51) Int. Cl.
*G06T 11/00*    (2006.01)
*G06T 11/40*    (2006.01)
*G06T 1/60*    (2006.01)

(52) U.S. Cl.
CPC ................ *G06T 11/00* (2013.01); *G06T 1/60* (2013.01)

(58) Field of Classification Search
CPC . G06T 11/00; G06T 1/60; G06T 11/40; G06T 1/20; G06F 16/2237
See application file for complete search history.

(56) References Cited

U.S. PATENT DOCUMENTS

2015/0062142 A1 * 3/2015 Goel ...................... G06T 11/203
                                                                 345/582

FOREIGN PATENT DOCUMENTS

| JP | 2001209813 A | * | 8/2001 | ............. G06T 11/40 |
| JP | 3796478 B2 | * | 7/2006 | ............. G06T 11/40 |
| KR | 20100052850 A | * | 5/2010 | ............... G06T 9/20 |

* cited by examiner

*Primary Examiner* — Said Broome
*Assistant Examiner* — Donna J. Ricks

(57) ABSTRACT

The present disclosure provides a vector graphics data processing method, system, medium, and vector graphics processing device. The method includes the following operations: building a vector primitive path intersection data structure (PIDS) based on coordinates of path intersections (PIs); when a new PI is generated, comparing information of the new PI to information of existing PIs corresponding to an X coordinate or Y coordinate of the new PI; and storing the information of the new PI at a corresponding position in the PIDS corresponding to the X coordinate or Y coordinate of the new PI based on a result of the comparing. Only effective PI data are saved, thereby reducing memory footprint and memory bandwidth, and improving vector graphics processing performance.

10 Claims, 2 Drawing Sheets

METHOD, SYSTEM, MEDIUM, AND DEVICE FOR PROCESSING VECTOR GRAPHICS PRIMITIVES TO DETERMINE PATH EDGE ORDER FOR PATH FILLING

CROSS REFERENCE TO RELATED APPLICATION

The present application claims the benefit of priority to Chinese Patent Application No. CN 2020106928461, entitled "VECTOR GRAPHICS DATA PROCESSING METHOD, SYSTEM, MEDIUM AND VECTOR GRAPHICS PROCESSING DEVICE", filed with CNIPA on Jul. 17, 2020, the disclosure of which is incorporated herein by reference in its entirety for all purposes.

FIELD OF TECHNOLOGY

The present disclosure generally relates to a data processing method, in particular to a vector graphics primitive path intersection data processing method, system, medium, and vector graphics processing device.

BACKGROUND

In vector graphic applications, modes for filling vector primitive paths include zero/non-zero and even/odd modes. For any fill mode, in order to determine if a pixel should be filled, the renderer must calculate the number of intersections between a vector starting from the pixel extending out infinitely at any direction and the edges of the vector primitive path. Since the vector can be in any direction, this invention has chosen horizontal scan line with the direction toward minimum x or toward left of the view port when facing the view port.

Conventionally, sorting is not performed during PIs generation stage of the rendering. When a PIs is calculated, it is store in a Path Instersection Data Structure (PIDS) buffer similar to frame buffer. The buffer contains all locations of the viewport. The PIs are stored according to the x and y coordinates into the buffer. Most of the locations of the PIDS are empty. Each vector primitive path has its own PIDS buffer.

Conventionally, during the filling stage of rendering, sorting is performed by searching PIDS buffer from left (small x) to right (large x) for each scan line or y. When a PIs is found, it is retrieved from memory and then the PIs count is incremented. If the count is from zero to one, searching continues until the next PIs is found. Depending on the fill mode, the pixels between the two PIs are filled or not filled. Then the PIs count is incremented again before search continues until the next PIs is found or at the end of the scan line.

However, the above method has the following shortcomings:

(1) The PIDS is too large for almost all systems. For some systems it is prohibitively large occupying significant amount memory resources causing the system to fail; for an 8K×8K viewport, the PIDS could occupy 256 MB of memory or more;

(2) In order to find PIs, the renderer must search in the PIDS up to 8K pixels per Y line, which seriously affects the performance of the render;

(3) Most entries in PIDS are empty positions with no PI. The number of empty positions increases as resolution increases. However, the algorithm dictates that the render must search through all X positions in each Y line, causing a waste of precious memory bandwidth.

SUMMARY

The present disclosure provides a vector graphics data processing method, system, medium, and vector graphics processing device. Only effective intersection data are saved, thereby reducing memory footprint, memory bandwidth, and improving performance.

The method includes the following operations: building a vector primitive path intersection data structure (PIDS) based on coordinates of path intersections (PIs); when a new PI is generated, comparing information of the new PI to information of existing PIs corresponding to an X coordinate or Y coordinate of the new PI; and storing the information of the new PI at a corresponding position in the PIDS corresponding to the X coordinate or Y coordinate of the new PI based on a result of the comparison.

In one embodiment, the information of the new PI comprises the X coordinate, the Y coordinate, an effective sub-pixel number, and a direction of the new PI.

In one embodiment, when the information of the new PI is compared to the information of the existing PIs, the X coordinate of the new PI is compared to X coordinates of the existing PIs, and the new PI is stored at a position in the PIDS corresponding to the Y coordinate of the new PI based on a relationship between the X coordinates of the new PI and the existing PIs; or, when the information of the new PI is compared to the information of the existing PIs, the Y coordinate of the new PI is compared to Y coordinates of the existing PIs, and the new PI is stored at a position in the PIDS corresponding to the X coordinate of the new PI based on a relationship between the Y coordinates of the new PI and the existing PIs.

In one embodiment, the relationship between the X coordinates or the Y coordinates of the new PI and the existing PIs is a relationship where the X coordinates or the Y coordinates are sorted from small to large or from large to small.

The present disclosure also provides a vector graphics data processing system, including a construction module, a comparison module, and a storage module;

The construction module constructs a vector primitive path intersection data structure (PIDS) in memory according to coordinates of path intersections (PIs).

When a new PI is generated, the comparison module compares information of the new PI to information of existing PIs corresponding to an X coordinate or Y coordinate of the new PI.

The storage module stores the information of the new PI at a corresponding position in the PIDS corresponding to the X coordinate or Y coordinate of the new PI based on a result of the comparison.

In one embodiment, the information of the new PI comprises the X coordinate, the Y coordinate, an effective sub-pixel number, and a direction of the new PI.

In one embodiment, when the information of the new PI is compared to the information of the existing PIs, the X coordinate of the new PI is compared to X coordinates of the existing PIs, and the new PI is stored at a position in the PIDS corresponding to the Y coordinate of the new PI based on a relationship between the X coordinates of the new PI and the existing PIs; or, when the information of the new PI is compared to the information of the existing PIs, the Y coordinate of the new PI is compared to Y coordinates of the existing PIs, and the new PI is stored at a position in the PIDS corresponding to the X coordinate of the new PI based on a relationship between the Y coordinates of the new PI and the existing PIs.

In one embodiment, the relationship between the X coordinates or the Y coordinates of the new PI and the existing PIs is a relationship where the X coordinates or the Y coordinates are sorted from small to large, or from large to small.

The present disclosure also provides a storage medium on which a computer program is stored; when the computer program is executed by a processor, the vector graphics data processing method mentioned above is realized.

Finally, the present disclosure provides a vector graphics processing device, including: a processor and a memory;

The memory is used for storing computer programs.

The processor is used to execute the computer programs stored in the memory to cause the vector graphics processing device to perform the vector graphics data processing method mentioned above.

As described above, the vector graphics processing device, system, medium and vector graphics processing device of the present disclosure have the following beneficial effects:

(1) Since the PIDS does not contain any empty position, there is no need to search an entire viewport when rendering, there is no need to determine if a position is empty or occupied by a PI, and only $1/1024$ to $1/32$ of memory space (even less in some cases) is required compared to prior art.

(2) Power consumption and cost of vector graphics processing are reduced, and vector graphics processing performance is improved;

(3) PIs can be read by the renderer in the order they are stored, so that there is no time spent on searching for intersections, and memory bandwidth is reduced.

REFERENCE NUMERALS

| | |
|---|---|
| 21 | construction module |
| 22 | comparison module |
| 23 | storage module |
| 31 | processor |
| 32 | memory |

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure.

It should be noted that the following embodiments and the features in the embodiments can be combined with each other if no conflict will result. It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The vector graphics data processing method, system, medium, and vector graphics processing device of the present disclosure only save effective path intersection (PI) data, thereby reducing memory footprint; meanwhile PI data are stored in a preset order, which avoids searching operations, and enhances vector graphics processing performance of the system.

Figure 1:
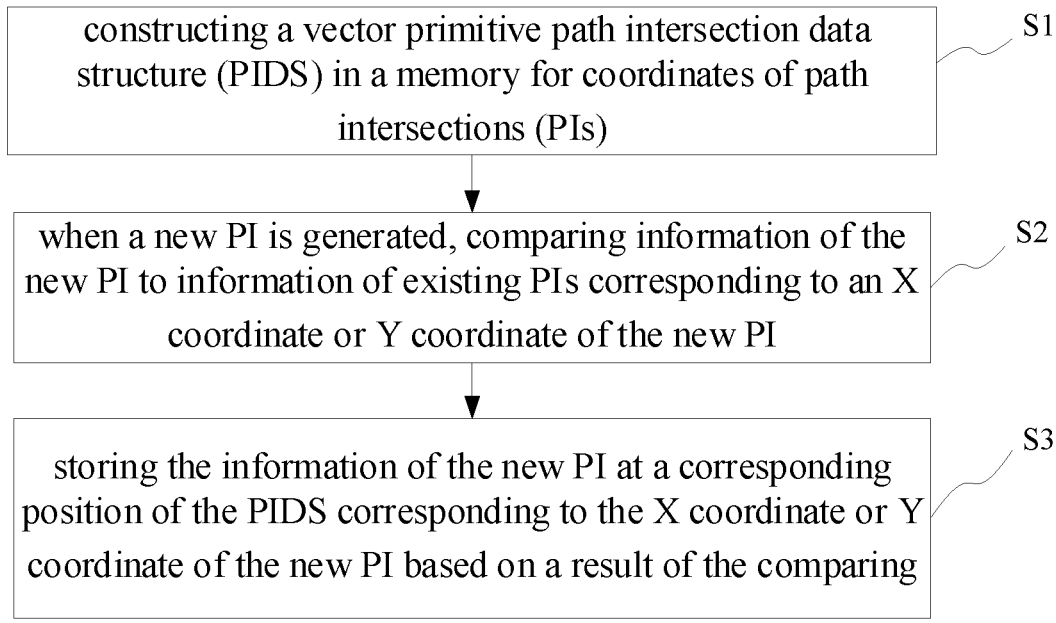
FIG. 1 is a flowchart showing various operations of a vector graphics data processing method according to an embodiment of the present disclosure.

As shown in FIG. 1, the vector graphics data processing method of present disclosure includes the following operations: Operation S1, constructing a vector primitive path intersection data structure (PIDS) in a memory for coordinates of path intersections (PIs); Operation S2, when a new PI is generated, comparing information of the new PI to information of existing PIs corresponding to an X coordinate or Y coordinate of the new PI; and Operation S3, storing the information of the new PI at a corresponding position in the PIDS corresponding to the X coordinate or Y coordinate of the new PI based on a result of the comparison.

The vector graphics data processing method of present disclosure is further illustrated below by specific embodiments. This method and its operations may be performed by a vector graphic data processing system, processor, or device, or by one or more hardware modules of the vector graphic data processing system.

Embodiment 1

As shown in FIG. 1, the vector graphics data processing method includes the following operations: S1, which corresponds to operations S11 and S21; S2, which corresponds to operations S12 and S22; and S3, which corresponds to operations S13 and S23.

Operation S11, building a PIDS in the memory based on Y coordinates of PIs.

Specifically, when processing a vector graphic, a PIDS is constructed for a Y coordinate, for storing information of PIs with the Y coordinate. In one embodiment, information of a PI comprises the X coordinate, the Y coordinate, an effective sub-pixel number, and a direction of the PI.

Operation S12, when a new PI is generated, comparing information of the new PI to information of existing PIs corresponding to a Y coordinate of the new PI; and In some embodiments, S12 further includes: when it is necessary to store a new PI in the memory, first acquiring information of existing PIs in the PIDS corresponding to the Y coordinate of the new PI. Specifically, S12 further includes: obtaining X coordinates of the existing PIs. The values of the X coordinate of the new PI are compared to the X coordinates of the existing PIs, and a result of the comparing is then obtained.

Operation S13, storing the information of the new PI at a position in the PIDS corresponding to the Y coordinate of the new PI based on the result of the comparison.

Specifically, S13 includes: storing the information of the new PI at a position in the PIDS corresponding to the Y coordinate of the new PI based on the result of the comparing the values of the X coordinates.

In one embodiment, the new PI is stored in a position in the PIDS corresponding to the Y coordinate of the new PI, based on the relationship between the X coordinate of the new PI and the X coordinates of the existing PIs. For example, when the X coordinates of the existing PI information are, from small to large, 3, 5, 6, 33 . . . , and the X coordinate of the new PI is 9, then the information of the new PI is stored between wherein information of the third existing PI (i.e. the PI with an X coordinate of 6) is stored, and where information of the fourth existing PI (i.e., the PI with an X coordinate of 33) is stored. Because information of PIs in the PIDS is stored according to their X coordinates, there is no need to search for information of a certain PI during vector graphics rendering, and instead the information can be directly read, thereby eliminating the need for such searching and improving the system's processing performance.

Embodiment 2

Operation S21, building a PIDS in the memory based on X coordinates of PIs.

Specifically, when processing vector graphics, a PIDS is constructed for an X coordinate, for storing information of PIs with the X coordinate. In one embodiment, information of a PI comprises the X coordinate, the Y coordinate, an effective sub-pixel number, and a direction of the PI.

Operation S22, when a new PI is generated, comparing information of the new PI to information of existing PIs corresponding to an X coordinate or Y coordinate of the new PI; and In some embodiments, S22 further includes: when it is necessary to store a new PI in the memory, first acquiring information of existing PIs in the PIDS corresponding to the X coordinate of the new PI. Specifically, S22 further includes: obtaining Y coordinates of the existing PIs. The values of the Y coordinate of the new PI are compared to the Y coordinates of the existing PIs, and a result of the comparison is then obtained.

Operation S23, storing the information of the new PI at a corresponding position in the PIDS corresponding to the X coordinate of the new PI based on the result of the comparison.

Specifically, S23 includes: storing the information of the new PI at a position in the PIDS corresponding to the X coordinate of the new PI based on the result of comparing the values of the X coordinates.

In one embodiment, the new PI is stored in a position in the PIDS corresponding to the X coordinate of the new PI, based on the relationship between the Y coordinate of the new PI and the Y coordinates of the existing PIs. Because information of PIs in the PIDS is stored according to their Y coordinates, there is no need to search for information of a certain PI during vector graphics rendering, and instead the information can be directly read, thereby eliminating the need for such searching and improving the system's processing performance.

Figure 2:
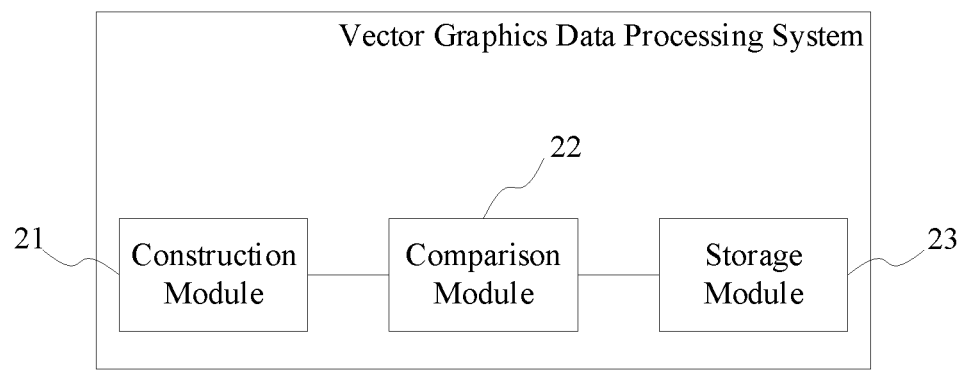
FIG. 2 shows a schematic diagram of a vector graphics data processing system according to an embodiment of present disclosure.

As shown in FIG. 2, the present disclosure provides a vector graphics data processing system, which includes a construction module 21, a comparison module 22, and a storage module 23; each of which may be a dedicated special-purpose computer processor (e.g., graphic processing unit) or electronic module.

The construction module 21 constructs a vector primitive path intersection data structure (PIDS) in a memory for coordinates of path intersections (Pis). The memory may be a cache or memory module in the vector graphics data processing system. The construction module 21 may receive a vector graphics path, process this vector graphics path, and construct the PIDS for PIs associated with the vector graphics path.

The comparison module 22 is connected to the construction module 21, and when a new PI is generated, the comparison module 22 compares information of the new PI to information of existing PIs corresponding to an X coordinate or Y coordinate of the new PI.

The storage module 23 is connected to the comparison module 22, and the storage module 23 stores the information of the new PI at a corresponding position in the PIDS corresponding to the X coordinate or Y coordinate of the new PI based on a result of the comparison.

The structure and principle of the construction module 21, comparison module 22, and storage module 23 correspond to the operations in the vector graphics data processing method.

It needs to be noted that it should be understood that the division of modules of the above device is only a logical function division, and the modules can be fully or partially integrated into a physical entity or physically separated in the actual implementation. In one embodiment, these modules can all be implemented in the form of software called by processing components. In one embodiment, they can also be all implemented in the form of hardware. In one embodiment, some of the modules can also be realized in the form of software called by processing components, and some of the module can be realized in the form of hardware.

For example, a certain module may be separated by processing components, or it may be integrated into a chip of the device, or it may be stored in the memory of the device in the form of programs, and the function of the module may be performed by one or several processing component(s) of the device. The implementation of other modules is similar. In addition, all or part of these modules can be integrated together, or can be implemented separately. The processing component may be an integrated circuit with capability of signal processing. In one implementation, each operation or each module of the above method can be implemented by hardware integrated circuits or software instructions in the processing component.

For example, the above modules can be one or more integrated circuits configured to implement the above methods, such as: one or more Application Specific Integrated circuits (ASICs), or one or more Microprocessor, or one or more Field Programmable Gate Arrays (FPGAs). For another example, when one of the above modules is implemented in the form of processing component calling software, the processing component can be a generic processor, such as a Central Processing Unit (CPU), or another processor that can call programs. Alternatively, these modules can be integrated together and implemented as a System-on-a-Chip (SoC).

The present disclosure also provides a storage medium on which a computer program is stored; when the computer program is executed by a processor, the vector graphics data processing method mentioned above is realized. The memory may be a ROM, RAM, magnetic disk, flash drive, memory card, optical disk, or other medium that can store program codes.

Figure 3:
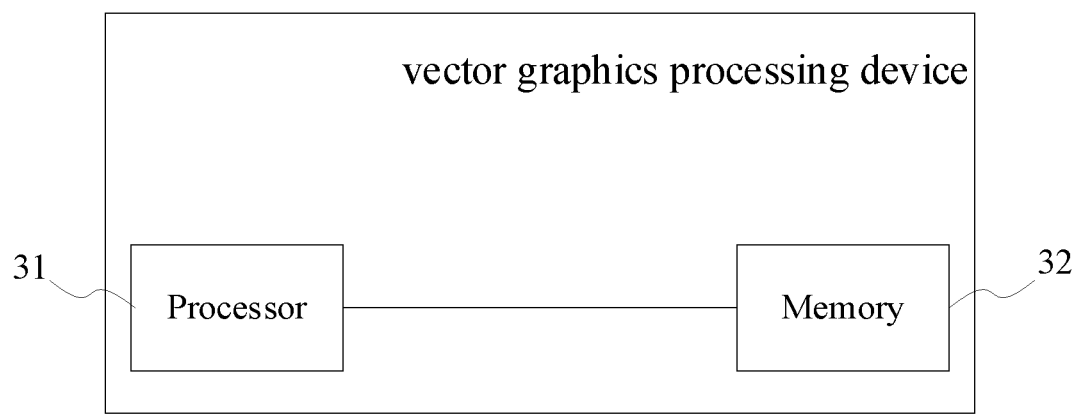
FIG. 3 shows a schematic diagram of a vector graphics processing device according to an embodiment of present disclosure.

As shown in FIG. 3, in one embodiment, a vector graphics processing device of the present disclosure comprises a processor 31 and a memory 32.

The memory 32 stores computer programs;

The memory 32 includes one or more of a ROM, RAM, magnetic disk, flash drive, memory card, optical disk, or other medium that can store program codes.

The processor 31 is connected to the memory 32, and is used to execute the computer programs stored in the memory to drive the vector graphics processing device to perform the vector graphics data processing method mentioned above.

Preferably, the processor 31 can be a general processor, including a Central Processing Unit (CPU), a Graphic Processing Unit (GPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

In summary, the vector graphics processing device, system, medium, and vector graphics processing device of the present disclosure have the following beneficial effects: (1) Since the PIDS does not contain any empty position, there is no need to search an entire viewport when rendering, there is no need to determine if a position is occupied or not by a PI, and only 1/1024 to 1/32 of memory space (even less in some cases) is required compared to prior art. (2) Power consumption and area cost of vector graphics processing are reduced, and vector graphics processing performance is improved; (3) PIs can be read by the renderer in the order they are stored, so that there is no time spent on searching for intersections, and memory bandwidth is reduced. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A vector graphics data processing method, comprising:
    building a vector primitive path intersection data structure (PIDS) based on coordinates of path intersections (PIs), wherein the PIs are intersections between scan lines and vector primitive path in a vector graphics image, the PIs are configured to determine path edge order for path filling, and the PIDS is configured to store only valid PIs for the vector primitive path;
    when a new PI is generated, comparing information of the new PI to information of the existing PIs in the PIDS corresponding to the X coordinate or the Y coordinate of the PIs; and
    storing the information of the new PI at a corresponding position in the PIDS corresponding to the X coordinater or the Y coordinate of the new PI based on a result of the comparison.

2. The vector graphics data processing method according to claim 1, wherein
    the information of the new PI comprises the X coordinate, the Y coordinate, an effective sub-pixel number, and direction of the new PI.

3. The vector graphics data processing method according to claim 1, wherein:
    when the information of the new PI is compared to the information of the existing PIs, the X coordinate of the new PI is compared to X coordinates of the existing PIs, and the new PI is stored at a position in the PIDS corresponding to the Y coordinate of the new PI based on a relationship between the X coordinates of the new PI and the existing PIs; or
    when the information of the new PI is compared to the information of the when the information of the new PI is compared to the information of the existing PIs, the Y coordinate of the new PI is compared to Y coordinates of the existing PIs, and the new PI is stored at a position in the PIDS corresponding to the X coordinate of the new PI based on a relationship between the Y coordinates of the new PI and the existing PIs.

4. The vector graphics data processing method according to claim 3, wherein a relationship between the X coordinates or the Y coordinates of the new PI and the existing PIs is a relationship where the X coordinates or the Y coordinates are sorted from small to large or from large to small.

5. A non-transitory storage medium on which a computer program is stored, wherein when the computer program is executed by a processor, driving the processor to perform a vector graphics data processing method according to claim 1.

6. A vector graphics processing device, comprising a processor and a memory, wherein
    the memory stores computer programs, and
    the processor executes a computer program stored in the memory to drive the vector graphics processing device to perform the vector graphics data processing method according to claim 1.

7. A vector graphics data processing system, comprising a construction module, a comparison module, and a storage module;
    wherein the construction module constructs a vector primitive path intersection data structure (PIDS) in a memory from coordinates of path intersections (PIs), wherein the PIs are intersections between scan lines and vector primitive path in a vector graphics image, the PIs are configured to determine path edge order for path filling, and the PIDS is configure to store only valid PIs in the vector graphics image,
    wherein when a new PI is generated, the comparison module compares information of the new PI to information of the existing PIs corresponding to the X coordinate or the Y coordinate of the PIs, and
    wherein the storage module stores the information of the new PI at a corresponding position in the PIDS corresponding to the X coordinate or the Y coordinate of the new PI based on a result of the comparison.

8. The vector graphics data processing system according to claim 7, wherein the information of the new PI comprises the X coordinate, the Y coordinate, an effective sub-pixel number, and a direction of the new PI.

9. The vector graphics data processing system according to claim 7, wherein:
    when the information of the new PI is compared to the information of the existing PIs, the X coordinate of the new PI is compared to X coordinates of the existing PIs, and the new PI is stored at a position in the PIDS corresponding to the Y coordinate of the new PI based on a relationship between the X coordinates of the new PI and the existing PIs; or when the information of the new PI is compared to the information of the when the information of the new PI is compared to the information of the existing PIs, the Y coordinate of the new PI is compared to Y coordinates of the existing PIs, and the new PI is stored at a position in the PIDS corresponding to the X coordinate of the new PI based on a relationship between the Y coordinates of the new PI and the existing PIs.

10. The vector graphics data processing system according to claim 9, wherein a relationship between the X coordinates or the Y coordinates of the new PI and the existing PIs is a relationship where the X coordinates or the Y coordinates are sorted from small to large or from large to small.

\* \* \* \* \*